United States Patent

Nishijima

[11] Patent Number: 5,185,997
[45] Date of Patent: Feb. 16, 1993

[54] GAS TURBINE SYSTEM

[75] Inventor: Tsunemasa Nishijima, Hitachi, Japan

[73] Assignee: Hitachi, Ltd., Tokyo, Japan

[21] Appl. No.: 646,433

[22] Filed: Jan. 28, 1991

[30] Foreign Application Priority Data

Jan. 30, 1990 [JP] Japan .................. 02-019579

[51] Int. Cl.⁵ .................. F02C 6/18; F02G 3/00
[52] U.S. Cl. .................. 60/39.07; 60/740
[58] Field of Search .................. 60/39.07, 39.75, 740

[56] References Cited

U.S. PATENT DOCUMENTS

| | | | |
|---|---|---|---|
| 3,487,993 | 1/1970 | Rannenberg | 60/39.07 |
| 3,668,869 | 6/1972 | De Corso et al. | 60/740 |
| 3,905,191 | 9/1975 | Matto | 60/39.07 |
| 4,711,084 | 12/1987 | Brockett | 60/39.07 |

FOREIGN PATENT DOCUMENTS

| | | |
|---|---|---|
| 71420 | 7/1982 | European Pat. Off. . |
| 0231952 | 12/1987 | European Pat. Off. . |
| 3325171 | 7/1983 | Fed. Rep. of Germany . |
| 59-15635 | 1/1984 | Japan . |
| 2016673 | 2/1979 | United Kingdom . |

OTHER PUBLICATIONS

EP 91 10 1140 European Search Report, May 14, 1991.

Primary Examiner—Richard A. Bertsch
Assistant Examiner—Howard R. Richman
Attorney, Agent, or Firm—Antonelli, Terry, Stout & Kraus

[57] ABSTRACT

A gas turbine system of the type including an air compressor, a turbine, a combustor, a turbine cooling unit, and a fuel oil atomizing unit. The turbine cooling unit includes a cooling air passage which communicates an air discharge port of the air compressor to a cooling air intake of the turbine. The turbine cooling unit further includes an intercooler provided in the cooling air passage, and an air filter provided in the cooling air passage downstream of the intercooler. The fuel oil atomizing unit includes an atomization air passage branching from the cooling air passage downstream of the air filter and communicating to an air inlet of the fuel nozzle, and an atomization air compressor, disposed in the atomization air passage, for compressing atomization air.

4 Claims, 3 Drawing Sheets

GAS TURBINE SYSTEM

BACKGROUND OF THE INVENTION

1. Field of the Invention

The present invention relates to a gas turbine system which includes an air compressor, a turbine, and a combustor with a fuel nozzle.

2. Description of the Prior Art

In a conventional gas turbine system of the aforementioned type the gas turbine system is provided with a turbine cooling unit for cooling the turbine and a fuel oil atomizing unit for atomizing a fuel oil. The turbine cooling unit introduces part of air from the air compressor into the turbine for cooling, and the fuel oil atomizing unit introduces another part of air from the air compressor into the fuel nozzle for atomization. The above described conventional gas turbine system is disadvantageous in that there is duplication in the air filter and a cooler, and the piping around the air compressor and the turbine is complicated.

SUMMARY OF THE INVENTION

Accordingly, it is an object of the present invention to provide a gas turbine system which is capable overcoming the above noted problems of the conventional system has a small number of components, and an uncomplicated piping system as compared to the gas turbine system according to the prior art.

With the above and other objects in view, the present invention provides a gas turbine system which comprises an air compressor having an air intake and an air discharge port, a turbine having a cooling air intake, a combustor including a fuel nozzle having a fuel oil inlet and an air inlet turbine cooling means, and fuel oil atomizing means. The turbine cooling means includes cooling air passage defining means for defining a cooling air passage communicating the air discharge port of the air compressor to the cooling air intake of the turbine, an intercooler provided in the cooling air passage, and an air filter provided in the cooling air passage downstream of the intercooler. The the fuel oil atomizing means includes atomization air passage defining means for defining an atomization air passage branching from the cooling air passage downstream of the air filter and communicating with the air inlet of the fuel nozzle, and an atomization air compressor, disposed in the atomization air passage, for compressing atomization air.

Preferably, the fuel oil atomizing means includes an air cooler for cooling air to be introduced into the atomization air compressor, with the air cooler being arranged in the atomization air passage upstream of the atomization air compressor.

The fuel nozzle may comprise a fuel gas inlet for introducing a fuel gas in a fuel gas operation mode. The fuel oil atomizing means may comprise a communication passage defining means for defining a communication passage for communicating a portion of the atomization air passage downstream of the atomization air compressor to another portion thereof upstream of the air cooler. Control valve means are provided in the communication passage, with the control valve means being adapted to open in the fuel gas operation mode to introduce air, discharged from the atomization air compressor, into the air cooler through the communication passage; whereas, the control valve means is adapted to close in a fuel oil operation mode.

The fuel nozzle may comprise a fuel gas inlet for introducing a fuel gas in a fuel gas operation mode. The fuel oil atomizing means may comprise a communication passage defining means for defining a communication passage communicating a portion of the atomization air passage downstream of the atomization air compressor to a portion of the cooling air passage upstream of the intercooler. A control valve means is provided in the communication passage, with the control valve means being adapted to open in the fuel gas operation mode to introduce air, discharged from the atomization air compressor, into the intercooler through the communication passage; whereas, the control valve means is adapted to close in a fuel oil operation mode.

The above and other objects, features and advantages of the present invention will be apparent from the following description of the embodiments when taken in connection with and the accompanying drawings.

DETAILED DESCRIPTION OF THE PREFERRED EMBODIMENTS

Prior to the description of the preferred embodiments of the present invention, a conventional gas turbine system referenced above will be briefly described briefly for a better understanding of the background art and disadvantages thereof.

Figure 3:
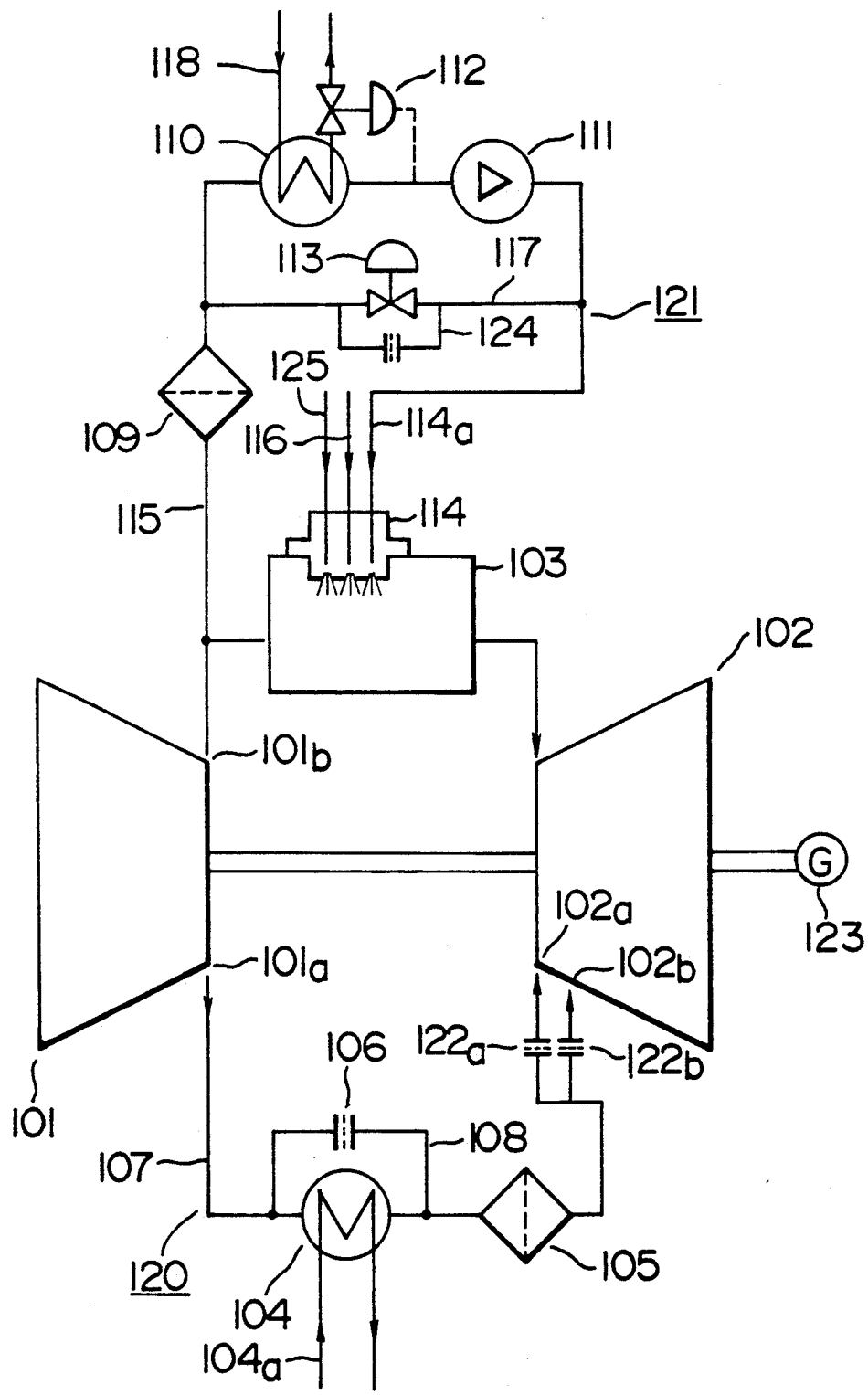
FIG. 3 is a schematic diagram of a conventional gas turbine system.

As shown in FIG. 3, a conventional gas turbine system includes a turbine cooling system 120 and a fuel oil atomizing system 121. The turbine cooling system 120 includes a conduit 107 for communication a discharge opening 101a of air compressor 101 to an air intakes 102a and 102b of the turbine 102 for cooling brackets and nozzles of the turbine 102. An intercooler 104 and an air filter 105 arranged downstream of the intercooler 104 are provided in the conduit 107. An orifice 106 is provided in a conduit 108 for controlling the temperature of cooling air, with the conduit 108 by-passing the intercooler 104. In the turbine cooling system 120, air discharged from the air compressor 101, at about 350° to 400° C., is cooled to about 200° to 250° C. in the intercooler 104, cleaned by the air filter 105, and is then introduced into the turbine 102. The conventional gas turbine system also includes, as shown in FIG. 3, a cooling water pipe 104a, flow rate regulating orifices 122a; 122b, and a generator 123.

The fuel oil atomizing system 121 includes an atomization air conduit 115 connects a discharge opening 101b of the air compressor 101 to an air intake 114a of a fuel nozzle 114 of a combustor 103. An air filter 109, an air cooler 110 and an air compressor 111 are disposed in the conduit 115 from an upstream end toward a downstream end thereof. The air cooler 110, the air compressor 111, a valve 113 for regulating the flow rate of the bypass, and an orifice 124 are provided in the by-passing conduit 117.

The air cooler 110 cools air (at about 350° to 400° C.) discharged from the air compressor 101, to a mechanically permissible temperature (about 80° to 100° C.) of the air compressor 111 which is made of an ordinary material. The air cooler 110 is provided at a cooling air pipe 118 thereof with a temperature control valve 112 to control the temperature of air at the outlet thereof to about 80° to 100° C. Atomization air induced into the fuel nozzle 114 atomizes a fuel oil supplied from a conduit 116 for improving the combustor 103 in combustion efficiency.

When it is assumed that an amount of air introduced into the air compressor 101 is 100, an amount of cooling air introduced into the turbine 102 is about 10, and an amount of air introduced into the fuel oil atomizing system 121 is about 1. The air flows into the air compressor 111, where it is heated during the pressurizing process, so that the temperature of the air discharged from the air compressor 111 becomes about 150° C.

In the gas turbine system of FIG. 3, a conduit 125 introduces a fuel gas during operation by fuel gas. During the fuel gas operation mode, the valve 113 is fully opened to introduce air discharged from the air compressor 111, to the conduit 117, and hence air does not enter the fuel nozzle 114. On the other hand, during operation by fuel oil the valve 113 is fully closed, and thereby air from the air compressor 111 is induced into the fuel nozzle 114.

The conventional gas turbine system is independently provided with the turbine cooling system 120 and the fuel oil atomizing system 121 and hence has the following problems.

First, it is necessary to provide an air filter and a cooler to each of the turbine cooling system 120 and the fuel oil atomizing system 121, thereby resulting in a considerable increase in the number of the components. This makes the gas turbine system rather complicated and expensive.

Second, air is drawn from the air compressor 101 separately through the conduits 107 and 115, and hence piping is crowded around the air compressor 101 and the turbine 102. This makes both the piping operation and the maintenance rather difficult.

Third, the fuel oil atomizing system 121 is encased in a turbine enclosure, and hence it is difficult to accommodate the fuel oil atomizing system 121 in the housing when parts of the system becomes large sized. Particularly, it is hard when the air filter 109 and the air cooler 110 become large sized.

A gas turbine system according to the present invention, which overcomes the drawbacks of the conventional gas turbine system, will now be described hereinafter.

Figure 1:
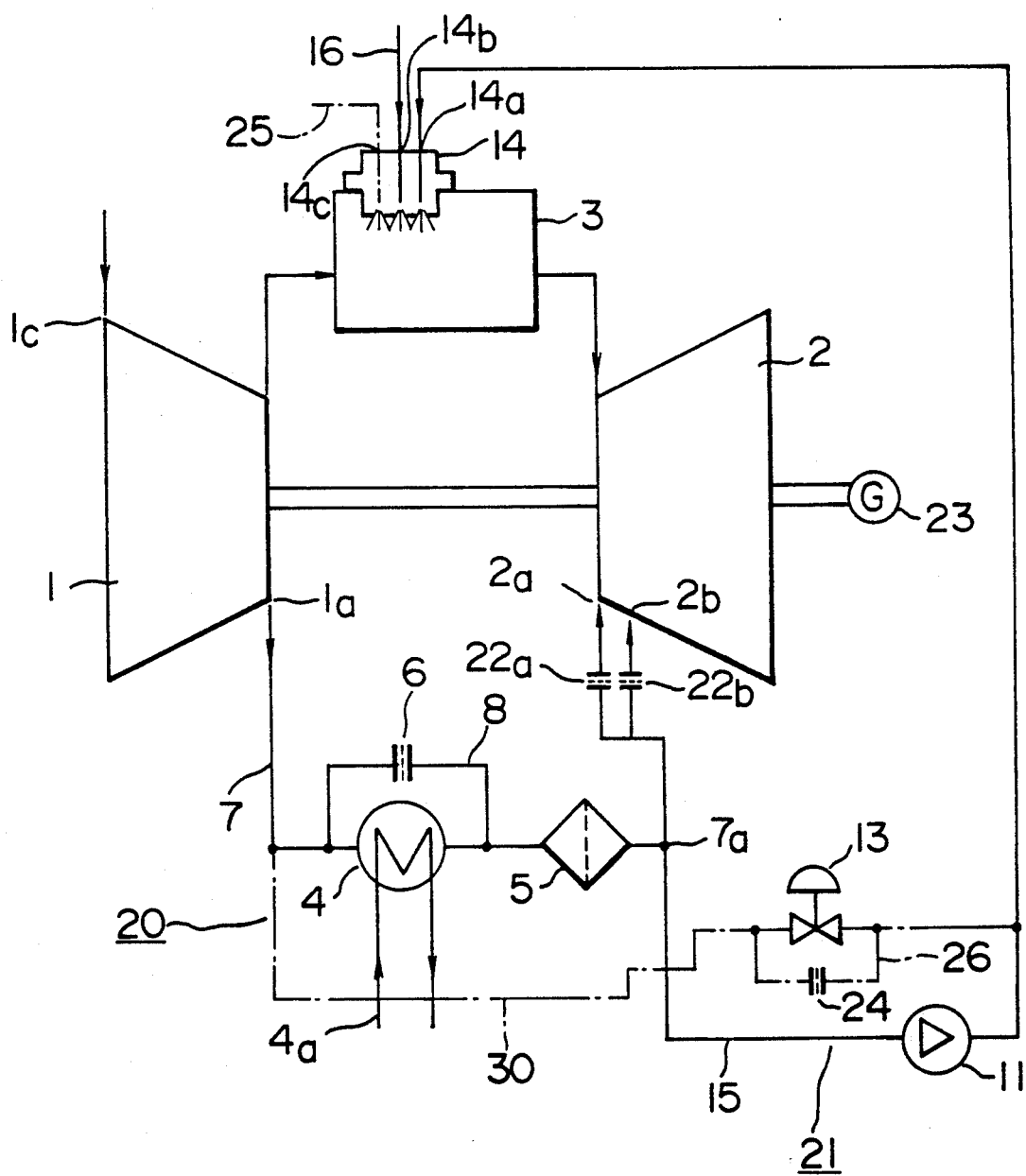
FIG. 1 is a schematic diagram showing a gas turbine system in accordance with one embodiment of the present invention.

In the embodiment of FIG. 1, the gas turbine system is also used for driving a generator 23, with the gas turbine system including an air compressor 1, a turbine 2, a combustor 3 with a fuel nozzle 14, a turbine cooling system 20 and a fuel oil atomizing system 21.

The turbine cooling system 20 is provided with a conduit 7 which communicates a discharge opening 1a of the air compressor 1 with cooling air intakes 2a and 2b of the turbine 2 guide blades of the turbine 2. An intercooler 4 and an air filter 5 arranged downstream of the intercooler 4 are provided in the conduit 7. An orifice 6 is provided in a conduit 8 for controlling the temperature of cooling air, with the conduit 8 by-passing the intercooler 4. The embodiment of FIG. 1 is the same as the conventional system of FIG. 3 in arrangement of these components.

The fuel oil atomizing system 21 includes an atomization air conduit 15 and an air compressor 11 provided in the conduit 15. The conduit 15 branches from the conduit 7 downstream of the air filter 5 and communicates to an air inlet 14a of the fuel nozzle 14.

In this gas turbine system, air discharged from the discharge opening 1a of the air compressor 1 at about 350° to 400° C. is cooled to about 200° to 250° C. in the intercooler 4 and is cleaned in the air filter 5. Part of the filtered air is then introduced into the turbine 2. The rest of the filtered air is introduced through the conduit 15 to the air compressor 11, where it is pressurized. Then, the air is introduced into the fuel nozzle 14, in which air atomizes a fuel oil which has been introduced into the fuel nozzle 14 through a conduit 16 and a fuel oil inlet 14b of the fuel nozzle 14. The atomized fuel is sprayed into the combustor 3.

As in the conventional gas turbine system of FIG. 3, when it is assumed that an amount of air introduced to the air compressor 1 through an air intake 1c of the compressor 101 is 100, an amount of cooling air introduced into the turbine 102 is about 10, and an amount of air to the fuel oil atomizing system 21 is about 1. Accordingly, the flow rate of air which passes through the portion of the conduit 7 between the air compressor 1 and a branch point 7a, the intercooler 4 and the air filter 5 must be increased by about 10% of that of air in the conventional system of FIG. 3. The conduit 15 branches from the conduit 7 at the branch point 7a. The distribution of the flow rate of air which flows in each of the branches and conduits is set by appropriately selecting the diameter of the conduits in view of resistance of air to the branches and the conduits. If not appropriate, the distribution of the air flow is adjusted by providing proper diameters of orifices 22a and 22b.

In the embodiment, the gas turbine system is operated by fuel oil but the gas turbine system may be modified so that the fuel oil operation mode and a fuel gas operation mode are appropriately selected. Modified portions of the gas turbine system to do so are illustrated by the dot-and-dash line in FIG. 1.

In the modified gas turbine system, the fuel nozzle 14 is provided with a fuel gas inlet 14c which is connected to a conduit 25 for the fuel gas. The fuel oil atomizing system 21 of the modified gas turbine system includes a conduit 30 which communicates a portion of the conduit 7 upstream of the intercooler 4 with a portion of the conduit 15 downstream of the air compressor 11. The conduit 30 is provided with a flow regulating valve 13, and an orifice 24 is provided in a conduit 26 which by-passes the flow regulating valve 13.

In operation by fuel oil, in the modified gas turbine system the flow of the fuel gas which pass through the conduit 25 is cut off whereas the fuel oil is introduced through the conduit 16 to the fuel nozzle 14. Furthermore, the flow regulating valve 13 is closed. Thus, air discharged from the air compressor 11 is introduced into the fuel nozzle 14. The orifice 24 is provided for adjusting the flow rate of air induced to the fuel nozzle 14 to an appropriate value with the same purpose as the orifices 22a and 22b.

On the other hand, in operation by fuel gas, the flow of the fuel oil which flows through the conduit 16 is cut off and the fuel gas is introduced to the fuel nozzle 14 through the conduit 25. In this mode, the flow regulating valve 13 is opened. Thus, air discharged from the air compressor 11 does not flow toward the fuel nozzle 14 but is introduced into the conduit 30. The introduced air passes through the intercooler 4 and the air filter 5. Then, part of the air is sent to the turbine 2 while the remaining air passes through the conduit 15 and the air compressor 11 and is returned to the conduit 30.

The actuation of the flow regulating valve 13 and the supply/cutoff of the fuel oil/gas to the fuel nozzle 14 through conduits 16 and 25 are automatically carried out in dependence upon whether the operation by fuel oil or by fuel gas is selected.

In the first embodiment as described, the flow rate of air which passes through the portion of the conduit 7 between the air compressor 1 and the branch point 7a, the intercooler 4, and the air filter 5 is increased by about 10% of that of air in the conventional system of FIG. 3. Although the system is thus slightly large sized in the portion of the conduit 7, the intercooler 4 and the air filter 5 as compared to the conventional system of FIG. 3 the embodiment of FIG. 1 has the following advantages:

First, air for cooling the turbine and air for atomizing fuel oil are extracted from the air compressor 1 through the common conduit, and the piping is thus simplified.

ii. The air filter (109 of FIG. 3) for oil fuel atomizing air is omitted and only one air filter 5 is used. Thus, the arrangement of the components within the turbine housing is simplified, the space of the turbine enclosure is reduced, and the cost of the equipment is reduced.

Figure 2:
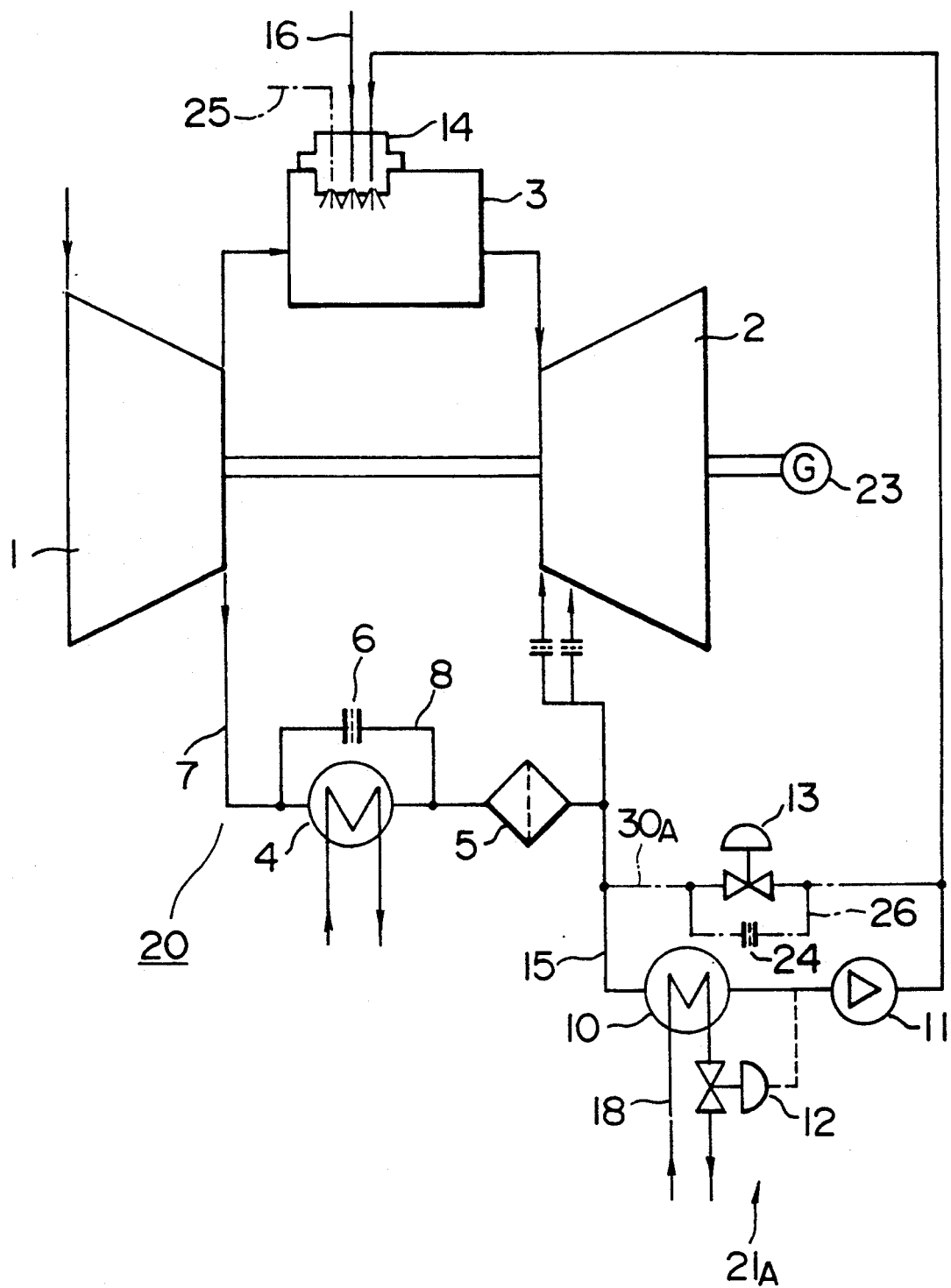
FIG. 2 is a schematic diagram of a gas turbine system according to a second embodiment of the present invention.

In the second embodiment of the present invention illustrated in FIG. 2, in which parts corresponding to parts of FIG. 1 are designated by the same reference numerals, an air cooler 10 is provided in the conduit 15 upstream of the air compressor 11 of the gas turbine system of FIG. 1 for atomizing the oil fuel. The air cooler 10 cools air (at about 200° to 250° C.) which has been introduced into the conduit 15 from the air filter 5 to a mechanically permissible temperature of the ordinary air compressor 11, about 80° to 100° C. A cooling water pipe 18 of the air cooler 10 is provided with a temperature control valve 12 to adjust the temperature of air at the outlet of the air cooler 10 to about 80° to 100° C. The air which flows in the air compressor 11 is heated during the pressurizing operation, and the temperature of air discharged from the air compressor 11 is about 150° to 200° C.

Modified portions of the gas turbine system of the second embodiment to selectively perform operations by fuel oil and fuel gas are shown by the dot-and-dash line in FIG. 2. In the modified gas turbine system, the fuel oil atomizing system 21A includes a conduit 30A which communicates a portion of the conduit 15 downstream of the air compressor 11 to another portion of the conduit 15 upstream of the air cooler 10. The conduit 30A is provided with a flow regulating valve 13, and an orifice 24 is provided to a conduit 26 which by-passes the flow regulating valve 13.

The second embodiment is the same in other points as the first embodiment and the description of the other construction thereof is omitted. As in the first embodiment, the flow regulating valve 13 of FIG. 2 is closed during operation by fuel oil and opened during operation by fuel gas.

The second embodiment achieves advantageous effects similar to those of the first embodiment. Moreover, the second embodiment has the following advantages.

First, in the second embodiment, air cooled by the intercooler 4 to about 200° to 250° C. is introduced into the air cooler 10 through the conduit 15 while in the conventional gas turbine system of FIG. 3, hot air at about 350° to 400° C. is delivered to the air cooler 110. Thus, degraded materials may be used for the conduit 15, air cooler 10, the temperature control valve 12 and other parts of the gas turbine system of FIG. 2.

Second, the air cooler 10 is reduced in the amount of heat exchange to a ¼ to ⅓ of the air cooler 110 in the conventional system of FIG. 3 since the temperature of air introduced into the air cooler 10 is relatively low. Thus, it is possible to fairly reduce the air cooler in size, and thereby the equipment cost may be reduced and the maintenance space in the turbine may be saved.

Third, in the second embodiment, air cooled in the air cooler 10 is introduced into the air compressor 11. Thus, the air compressor 11 does not need to be fashioned of any expensive heat resistant material. In this point, the system of the first embodiment of FIG. 1 is more expensive than that of the second embodiment of FIG. 2 since the former must use the air compressor 11 made of a heat resistant material. However, the first embodiment has an advantage of omitting the air cooler 10 used in the second embodiment.

I claim:

1. A gas turbine system comprising:
   an air compressor having an air intake and an air discharge port;
   a turbine having a cooling air intake;
   a combustor including a fuel nozzle including a fuel gas inlet for introducing a fuel gas in a fuel gas operation mode of the system, a fuel oil inlet and an air inlet;
   turbine cooling means including cooling air passage defining means for defining a cooling air passage communicating the air discharge port of the air compressor to the cooling air intake of the turbine, an intercooler provided in the cooling air passage, and an air filter provided in the cooling air passage downstream of the intercooler;
   fuel oil atomizing means including an air passage defining means for defining an atomization air passage branching from the cooling air passage downstream of the air filter and communicating with the air inlet of the fuel nozzle, an atomization air compressor disposed in the atomization air passage for compressing atomization air, an air cooler arranged in the atomization air passage upstream of the atomization air compressor for cooling air to be introduced into the atomization air compressor, and a communication passage defining means for defining a communication passage communicating a portion of the atomization air passage downstream of the atomization air compressor to another portion thereof upstream of the air cooler; and
   control valve means provided in the communication passage and being adapted to open in the fuel gas operation mode of the system to introduce air, discharged from the atomization air compressor, to the air cooler through the communication passage and to close in a fuel oil operation mode of the system.

2. A gas turbine system as recited in claim 1, wherein the fuel oil atomizing means comprises a by-pass defining means, arranged in the communication passage, for defining a by-pass passage to by-pass the control valve means, and a flow rate regulating orifice arranged in the by-pass passage.

3. A gas turbine system comprising:

an air compressor having an air intake and an air discharge port;

a turbine having a cooling air intake;

a combustor including a fuel nozzle including a fuel gas inlet for introducing a fuel gas in a fuel gas operation mode of the system, a fuel oil inlet and an air inlet;

turbine cooling means including cooling air passage defining means for defining a cooling air passage communicating the air discharge port of the air compressor to the cooling air intake of the turbine, an intercooler provided in the cooling air passage, and an air filter provided in the cooling air passage downstream of the intercooler;

a fuel oil atomizing means including an air passage defining means for defining an atomization air passage branching from the cooling air passage downstream of the air filter and communicating with the air inlet of the fuel nozzle, an atomization air compressor disposed in the atomization air passage for compressing atomization air, and a communication passage defining means for defining a communicating passage communication a portion of the atomization air passage downstream of the atomization air compressor to a portion of the cooling air passage upstream of the intercooler and control valve means provided in the communication passage and being adapted to open in the fuel gas operation mode of the system to introduce air, discharged from the atomization air compressor, to the intercooler through the communication passage and to close in a fuel oil operation mode of the system.

4. A gas turbine system as recited in claim 3, wherein the fuel oil atomizing means comprises a by-pass defining means, arranged in the communication passage, for defining a by-pass passage to by-pass the control valve means, and a flow rate regulating orifice arranged in the by-pass passage.

* * * * *